Feb. 28, 1939.　　　　　H. W. SEMAR　　　　　2,148,653

TURBINE BLADE

Filed Feb. 27, 1937

WITNESSES:
James K. Mosser
E. H. Litz

INVENTOR
HAROLD W. SEMAR
BY
A. B. Riavis
ATTORNEY

Patented Feb. 28, 1939

2,148,653

UNITED STATES PATENT OFFICE 2,148,653

TURBINE BLADE

Harold W. Semar, Springfield, Pa., assignor to Westinghouse Electric & Manufacturing Company, East Pittsburgh, Pa., a corporation of Pennsylvania Application February 27, 1937, Serial No. 128,046

8 Claims. (Cl. 253—77)

My invention relates to turbine blades and it has for an object to provide a root structure therefor constructed and arranged to avoid high stress concentrations.

A further object of my invention is to provide a turbine blade having a T-type root wherein the spacing and head portions thereof are of dissimilar section such that the bearing and shear areas of the head portion and the tension area of the neck may be arranged concentrically with respect to the line of action of the blade centrifugal force.

A further object of my invention is to provide a turbine blade root having lateral grooves defining a neck with a spacing portion arranged thereabove and a head portion arranged therebelow, the spacing portion conforming generally to the blade profile and the head portion being made rectangular and having its sides so disposed that the shear and bearing areas thereof are arranged concentrically with respect to the center of gravity of the tension area of the neck.

Where the centrifugal force of a turbine blade is high, the root division line between adjacent blades should be substantially midway therebetween; however, with reaction blading having a small exit angle, the profile and pitch of the blade section necessitates a root section of irregular shape. With the T-type of root for blades of this character, as heretofore constructed, the root has been of substantially uniform section above and below the neck with the result that severe stress conditions occur in root sections, the reason being that the shear and bearing areas of the head portion and the tension area of the neck are eccentric with respect to the line of action of the centrifugal force of the blade. In accordance with the present invention, the portion of the root above the neck is constructed, as heretofore, to secure the desired blade location and spacing in a blade groove and so as to bring the neck in such position that the line of action of the centrifugal force of the blade will act at the center of gravity of the neck tension area, but the head portion, instead of having the same section as the spacing portion, is made dissimilar with respect thereto so that the forces acting on the shear and bearing areas of the head portion are concentric with these areas, that is, the tension area of the neck and the shear and bearing areas of the head are concentric with the line of action of the blade centrifugal force. More specifically, the head portion is made rectangular in section with its sides so disposed that the forces acting on the shear and bearing areas thereof are concentric therewith, that is, the diagonals of the rectangular area intersect substantially at the center of the neck tension area.

These and other objects are effected by my invention as will be apparent from the following description and claims taken in connection with the accompanying drawing, forming a part of this application, in which:

Figure 1:
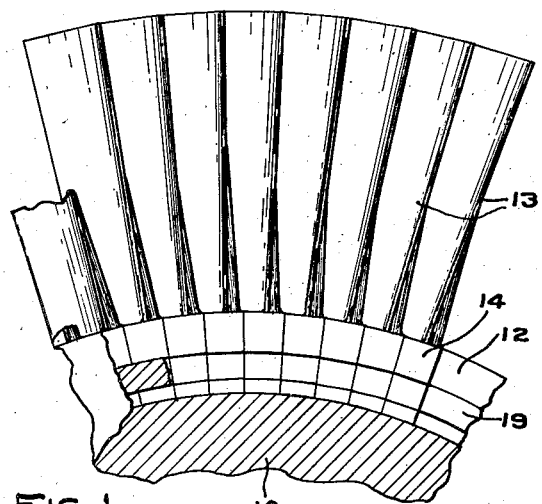
Fig. 1 is a fragmentary view of a turbine rotor, shown partly in section, with a group of blades.

Referring now to the drawing more in detail, there is shown a turbine rotor 10 having a blade groove 12 for blades 13 having roots 14 of the T-type. Each root 14 includes an upper spacing and positioning portion 15 and a lower head portion 16 joined by a neck portion 17, the spacing, head and neck portions defining lateral grooves or recesses 18 for the reception of lateral ribs 19 formed at the sides of the blade groove 12.

Figure 4:
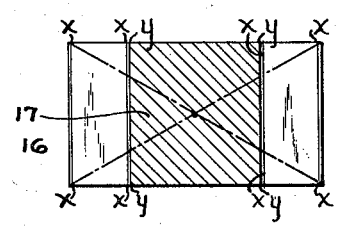
Figs. 4, 5, and 6 are sectional views taken along the line IV—IV, V—V and VI—VI of Fig. 2 and looking in the direction of the arrows.
Figure 2:
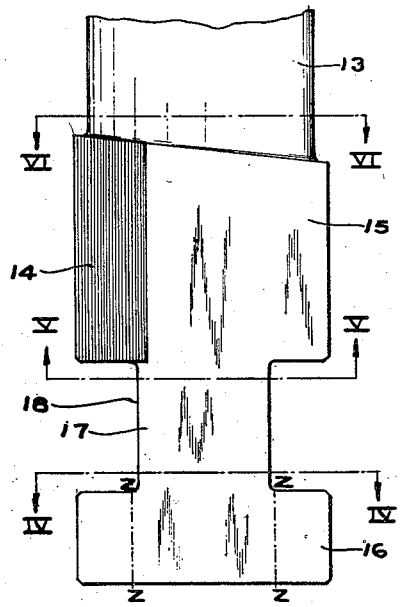
Fig. 2 is a fragmentary elevational view of a blade looking in the direction of the blade groove.
Figure 3:
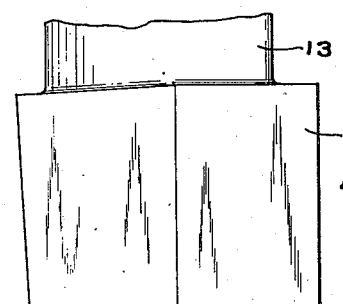
Fig. 3 is a view similar to Fig. 2 but viewed at right angles with respect to the latter.
Figure 5:
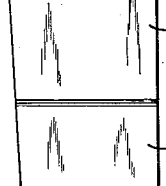
Figure 6:
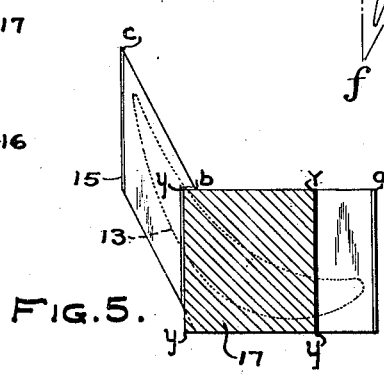

The blade roots 14 are so constructed and arranged that the portions 15 not only space and position the blades, but the lines of division, such as $abc$, in Fig. 5, fall substantially midway of adjacent blades and define the neck tension area so that the blade centrifugal force will act at the center of the neck tension area, the neck tension area being indicated at $yyyy$, in Fig. 4. The transverse section of each spacing portion is made up of rectangular and rhomboidal areas $b, c, d, e$ and $a, b, d, f$, respectively, with a common side $bd$, Fig. 6.

Since the neck 17 resists the blade centrifugal force in tension, the head portion 16 is subject to shearing force over the areas $zzzz$, and compressive force over the bearing areas $xxxx$.

If the head portion 16 had the same section as the spacing portion 15, as heretofore, the forces acting on the shear and bearing areas thereof would be eccentric with respect to such areas, that is, there would be lack of concentricity of the tension area of the neck and shear and bearing areas of the head portion with the line of action of the blade centrifugal force. To avoid the eccentric relation just pointed out and the consequent concentration of stresses, the head portion 16 is so constructed as to have a section which is not only dissimilar to the section of the spacing portion 15 but which is so constructed and arranged that the shear and bearing areas thereof as well as the tension area of the neck are concentric with the line of action of the blade centrifugal force. Preferably, the head portion is rectangular in section, the sides of the rectangular area extending in the direction of the blade groove 12 and at right angles thereto and the diagonals of the rectangular area intersecting substantially at the center of the tension area yyyy. With this arrangement of root head portion, it will be seen that the shear and bearing areas thereof are not only concentric with the tension area of the neck but all of these areas are concentric with the line of action of the blade centrifugal force. In other words, the spacing and head portions are so disposed that the line of action of the centrifugal force falls in the plane normal to and bisecting the shear areas zzzz and the bearing areas xxxx.

From the foregoing, it will be apparent that each turbine blade is comprised by blade and root parts; each root part having front and back surfaces normal to the plane of rotation, converging inwardly suitably to the curvature of the blade row, and so related to the blade section that the line of action of centrifugal force of the latter falls in the plane bisecting the dihedral angle defined by said surfaces. This will be evident from a consideration of Figs. 1 and 6, diminution in circumferential extent of the root part being indicated in Fig. 6, from which it will be noted that the circumferential dimension of the rectangular area b, c, e, d, is greater than that of the neck area and that the latter is somewhat greater than that of the head area. The spacing portion 14 has the front and back surfaces thereof defined by the rectangular area having sides in said root part front and back surfaces, the same is true with respect to the front and back surfaces of the head portion 16 and, preferably, the same is true with respect to the neck portion 17. Furthermore, it will be noted that the side surfaces of the neck portion 17 are spaced inwardly from the side surfaces of the head portion, thereby providing the bearing areas xxxx and the shear areas zzzz, the plane bisecting the dihedral angle also bisecting these areas and preferably also the tension area yyyy of the neck portion, whereby these stress areas are symmetrically disposed with respect to the line of action and uniform loading with avoidance of eccentric loading is secured.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. A turbine blade comprising blade and root parts; the root part including an outer spacing portion, an inner head portion, and a neck portion joining the spacing and head portions; said head portion having front and back faces for series contact in a blade row, said faces extending radially with respect to the row and being arranged in planes normal to the plane of rotation; said spacing portion having a section which is dissimilar to that of the head portion and which conforms to the blade section to provide front and back faces for series contact in a blade row for the full width of the latter; and said neck portion having side faces spaced inwardly from the side faces of the head portion to provide bearing and shear areas for the latter at each side of a blade and resisting centrifugal force of the latter.

2. A turbine blade comprising blade and root parts; the root part including an outer spacing portion, an inner head portion, and a neck portion joining the head and spacing portions; said head portion being rectangular in section and having front and back faces for series contact in a blade row, said front and back faces extending radially of the row and being arranged in planes normal to the plane of rotation; said spacing portion having a section which is dissimilar to that of the head portion and which conforms to the blade section to provide front and back faces for series contact in a blade row; said neck portion having side faces spaced inwardly from the side faces of the head portion so that the latter has bearing and shear areas at each side of the blade resisting centrifugal force thereof; and said blade and root parts being relatively so disposed that the centrifugal force line of action of the blade falls approximately at the intersection of the diagonals of the head portion.

3. A turbine blade comprising blade and root parts; the root part including an outer spacing portion, an inner head portion, and a neck portion joining the head and spacing portions; said head portion being rectangular in section and having front and back faces for series contact in a blade row, said front and back faces extending radially of the row and being arranged in planes normal to the plane of rotation; said spacing portion having a section which is dissimilar to that of the head portion and which conforms to the blade section to provide front and back faces for series contact in a blade row; said neck portion having side faces spaced inwardly from the side faces of the head portion so that the latter has bearing and shear areas at each side of the blade resisting centrifugal force thereof; and said blade and root parts being relatively so disposed and the neck portion being symmetrically arranged with respect to the front and back faces of the head portion so that the centrifugal force line of action of the blades falls approximately in the plane normal to the plane of rotation and bisecting said shear and bearing areas.

4. A turbine blade comprising blade and root parts; the blade part having a section such that, when assembled in a row, the inlet and discharge edges are spaced circumferentially; the root part including an outer spacing portion, an inner head portion, and a neck portion joining the spacing and head portion; said head portion having front and back faces for series contact in a blade row, said faces extending radially of the row and being arranged in planes normal to the plane of rotation; said spacing portion having a section comprised by adjoining rectangular and rhomboidal areas so that the section conforms in general to the blade section to provide front and back faces for series contact in a blade row for the full width of the latter; said neck portion having side faces spaced inwardly from the side faces of the head portion so that the latter has bearing and shear areas at each side of the blade row resisting centrifugal force thereof; and said blade and root parts being so disposed, the neck portion being symmetrically arranged with respect to the front and back faces of the head portion, and the head portion having such section that the line of action of centrifugal force of the blade falls in the normal plane bisecting the bearing and shear areas of the head portion.

5. A turbine blade comprising blade and root parts, the root part including an outer spacing portion, an inner head portion, and a neck portion joining the spacing and head portion; said head portion having front and back faces for series contact in a blade row, said faces extending radially of the row and being arranged in planes normal to the plane of rotation; said spacing portion having a section which is dissimilar to that of the head portion and which conforms to the blade section to provide front and back faces for series contact in a blade row for the full width of the latter; said neck portion having side faces spaced inwardly from the side faces of the head portion so that the latter has bearing and shear areas at each side of the blade resisting centrifugal force thereof; said blade and root parts being relatively so disposed and the neck portion having such section and being symmetrically disposed relative to the front and back faces of the head portion so that the centrifugal force line of action passes through the center of the neck portion section and falls in the plane normal to the plane of rotation and bisecting said bearing and shear areas.

6. A turbine blade comprising blade and root parts; said root part having front and back surfaces normal to the plane of rotation, providing for series contact of the root parts of the blades of a row, converging inwardly suitably to the curvature of the blade row, and so related to the blade section that the line of action of centrifugal force of the latter falls in the plane bisecting the dihedral angle defined by said surfaces; said root part including an outer spacing portion, an inner head portion and an intermediate neck portion joining said spacing and head portions; said outer spacing portion having a profile configurated to conform generally to the blade section and having front and back surfaces included in said root part front and back surfaces; said head portion having its front and back surfaces included in said root part front and back surfaces; and said neck portion being disposed symmetrically with respect to said root part front and back surfaces and having its side surfaces spaced inwardly from the side surfaces of the head portion to provide shear and outer bearing areas for the latter and said dihedral angle bisecting plane also bisecting said shear and bearing areas.

7. A turbine blade comprising blade and root parts and the blade part having a section such that when assembled in a row the inlet edge is spaced circumferentially from the outlet edge; said root part having front and back surfaces normal to the plane of rotation, providing for series contact of the root parts of the blades of a row, converging inwardly suitably to the curvature of the blade row, and so related to the blade section that the line of action of centrifugal force of the latter falls in the plane bisecting the dihedral angle defined by said surfaces; said root part including an outer spacing portion, an inner head portion, and an intermediate neck portion joining said spacing and head portions; said outer spacing portion having a section including adjoining rectangular and rhomboidal areas to provide a section conforming generally to the blade section and the rectangular area having front and back sides included in said root part front and back surfaces; said head portion having its front and back surfaces included in said root part front and back surfaces; and said neck portion having its front and back surfaces included in said root part front and back surfaces and having its side surfaces spaced inwardly from the side surfaces of the head portion to provide shear and outer bearing areas for the head portion and said dihedral angle bisecting plane also bisecting said shear and bearing areas.

8. A turbine blade comprising a blade and root parts and the blade part having an unsymmetrical blade section; said root part having front and back surfaces normal to the plane of rotation, providing for series contact of the root parts of the blades of a row, converging inwardly suitably to the curvature of the blade row, and so related to the blade section that the line of action of centrifugal force of the latter falls in the plane bisecting the dihedral angle defined by said surfaces; said root part including an outer spacing portion, an inner head portion of rectangular cross section, and an intermediate neck portion of rectangular cross section and connecting said spacing and head portions; said outer spacing portion having a section including adjoining rectangular and rhomboidal areas to provide a section conforming generally to the blade section; the part of said outer spacing portion defined by the rectangular area and said neck and head portions having front and back surfaces included in said root part front and back surfaces; and said neck portion having its side surfaces spaced inwardly from the side surfaces of the head portion to provide shear and outer bearing areas for the latter and said dihedral angle bisecting plane also bisecting said shear and outer bearing areas and the tension area of the neck portion.

HAROLD W. SEMAR.